US006254232B1

United States Patent
Friedman

(10) Patent No.: US 6,254,232 B1
(45) Date of Patent: Jul. 3, 2001

(54) SPRING CLIP FOR MOUNTING SUNGLASSES

(76) Inventor: Dean Friedman, 61 Ulster Ave., Atlantic Beach, NY (US) 11509

(*) Notice: Subject to any disclaimer, the term of this patent is extended or adjusted under 35 U.S.C. 154(b) by 0 days.

(21) Appl. No.: 09/637,375

(22) Filed: Aug. 15, 2000

(51) Int. Cl.[7] .................................................. G02B 9/00
(52) U.S. Cl. .............................................. 351/47; 351/57
(58) Field of Search ...................... 351/47, 57, 48, 351/58, 44, 41

(56) References Cited

U.S. PATENT DOCUMENTS

| D. 350,359 | 9/1994 | Friedman . |
| 3,575,497 | 4/1971 | LeBlanc . |
| 5,164,749 | 11/1992 | Shelton . |
| 5,258,786 | 11/1993 | Penrod . |
| 5,953,096 | 9/1999 | Friedman . |

*Primary Examiner*—Hung Xuan Dang
(74) *Attorney, Agent, or Firm*—Robert L. Epstein; Harold James; James & Franklin, LLP

(57) ABSTRACT

The clip includes a base to which a bistable sunglass lens carrying frame is mounted. The frame is moveable relative to the base between operative and inoperative positions. A "U" shaped spring biases the frame toward each position. First and second parts are mounted on the base for rotation in parallel plans, about a common axis perpendicular to the base, such that clamping arms extending from each of the parts are moved relative to clamping arms fixed to the base, between a position in which the clamping arms are proximate to each other and the eyeglasses are securely clamped therebetween, and a position in which the clamping arms are remote from each other. The spring also biases the parts toward the clamping position. The components are easily assembled, being held together by a single conventional fastener, in the form of a screw or a press-fit pin.

25 Claims, 4 Drawing Sheets

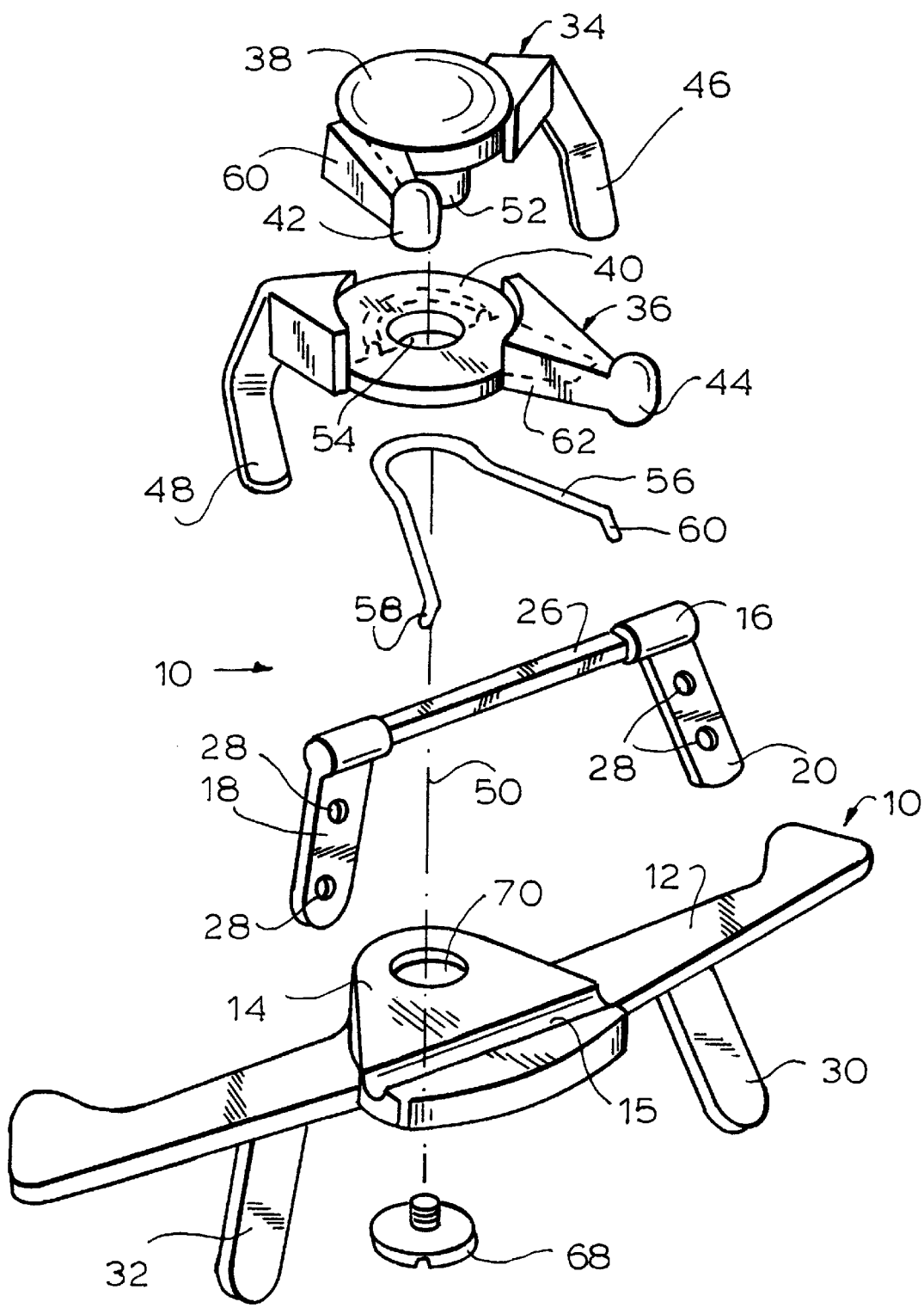
F I G. 1

SPRING CLIP FOR MOUNTING SUNGLASSES

The present invention relates to apparatus for removably mounting so-called "clip-on" sunglasses on eyeglasses and more particularly to a spring clip for mounting sunglass lenses which has a simple design, being made of a small number of inexpensively fabricated and easily assembled parts, which function reliably together for a long useful life.

U.S. Pat. No. 3,575,497 issued Apr. 20, 1971 to Conrad Leblanc entitled "Auxiliary Eye Protection Assembly" describes a commercially successful configuration for sunglass lenses adapted to removably clip onto spectacles. This structure has the advantage of permitting mounting of the sunglasses without removal of the spectacles. The LeBlanc assembly also allows the sunglass lenses to be pivoted between one of two stable positions, an operative position, wherein the lenses intersect the line of sight (parallel to and in front of the eyeglass lenses) and an inoperative position, wherein the lenses are remote from the line of sight (perpendicular to and above the eyeglass lenses). However, Leblanc's assembly required several precision parts and a custom double coil spring member.

On Nov. 17, 1992, U.S. Pat. No. 5,164,749 entitled "Clip for Mounting Sunglass Lenses on Spectacles" issued to Robert Shelton. The Shelton device, like the LeBlanc assembly, is designed to removably mount onto spectacles without the necessity of removing the spectacles from the head and, in addition, is capable of being pivoted relative to the spectacles between operative and inoperative positions. However, the Shelton clip consists of parts of simpler construction than the LeBlanc assembly. In particular, it utilizes a single simple elongated "C" shaped spring to retain the parts together and to provide the necessary biasing forces.

The Shelton clip includes a support and sunglass lens carrying means movably mounted relative to the support. Spectacle clamping means are also movably mounted relative to the support. The spring defines a recess into which the support, the lens carrying means and the clamping means are all received. The spring holds the support, carrying means and clamping means together. At the same time, the spring provides the force to bias the clamping means towards the clamping position and to bias the lens carrying means toward either an operative or inoperative position.

Although of extremely clever design, the Shelton clip has proved commercially impractical because it is very difficult to assemble. This is largely due to the fact that all of the parts are held together by the spring, which must be spread apart and held as the parts are assembled.

Also of note with respect to sunglasses of this type is U.S. Pat. No. 5,258,786 issued to William Penrod on Mar. 2, 1993, entitled "Attachable Pivotal Visor" and U.S. Design Pat. No. 350,359, issued to Sidney Friedman on Sep. 6, 1994, entitled "Clip For Clip-on Sunglasses."

The present invention overcomes the disadvantages of the prior art clips by simplifying the structure of the components and making the components more easy to assemble using a single conventional fastener.

It is, therefore, a prime object of the present invention to provide a spring clip for mounting sunglasses which is composed of a small number of easily assembled parts.

It is another object of the present invention to provide a spring clip for mounting sunglasses in which the parts are held together by a single conventional fastener, in the form of a screw or pin.

It is another object of the present invention to provide a spring clip for mounting sunglasses in which the parts function reliably together.

In accordance with one aspect of the present invention, a spring clip is provided for mounting sunglass lenses. The clip includes a base, a lens and frame mounted to the base, for carrying the lens. The base has first and second fixed clamping arms. First and second parts are provided. Each of the parts is provided with a clamping arm which is associated with one of the fixed clamping arms. The parts are mounted on the base for relative rotational movement about a common axis. The parts rotate between a position wherein the arms are proximate to each other and a position wherein the arms are remote from each other. Spring means are operably connected to the parts for urging the parts toward the proximate position.

Each of the parts includes a substantially radially extending handle member. Moving the handle members toward each other causes the parts to rotate toward the remote position, against the urging of the spring means.

Each of the parts has a substantially disk-shaped central portion. The parts rotate in parallel planes about a common axis perpendicular to the base.

One of the parts has a central opening. The other of the parts has a post adapted to be received within the opening.

The base has an opening adapted to be aligned with the post. The axis of the post is the common axis.

The spring means is substantially "U" shaped. The spring means has first and second arms. Each of the spring means arms is associated with a different one of the handle members.

The frame includes bistable lens mounting means which are movably mounted on the base. The lens mounting means are movable relative to the base between operative and inoperative positions. The spring urges the lens mounting means toward each of the positions. The lens mounting means is pivotally mounted on the base.

In accordance with another aspect of the present invention, a spring clip for mounting sunglass lenses is provided. The clip includes a base, a lens and a frame mounted on the base for carrying the lens. The base has a substantially planar surface. The frame includes bistable lens mounting means, mounted on the base, for movement between operable and inoperable positions. The mounting means includes an elongated element having first and second surfaces. Spring means are mounted on the base, in a plane substantially parallel to the base surface. The spring means includes an arm which cooperates with the elongated element surfaces to bias the lens mounting means toward each of its positions.

The spring means preferably has a substantially "U" shaped body with first and second arms.

The clip further comprises a first part mounted on the base. The first part has a post. The spring means is received around at least a portion of the post.

A second part is mounted on the base. The second part is situated between the base surface and the first part.

Each of the parts has a handle member. The spring means is operably interposed between the handles.

Each of the parts also includes a clamping arm. The base includes first and second fixed clamping arms. Each of the fixed clamping arms is associated with the clamping arm of a different one of the parts.

Each of the parts is mounted for movement relative to the base, between a position wherein the clamping arms are proximate each other and a position wherein the arms are remote from each other. The spring means urges the parts toward the proximate position.

To these and to such other objects which may hereinafter appear, the present invention relates to a clip for mounting sunglasses, as described in detail in the following specification and recited in the annexed claims, taken together with the accompanying drawings, in which like numerals refer to like par and in which:

FIG. 1 is an exploded isometric view of the clip of the present invention.

Figure 2:
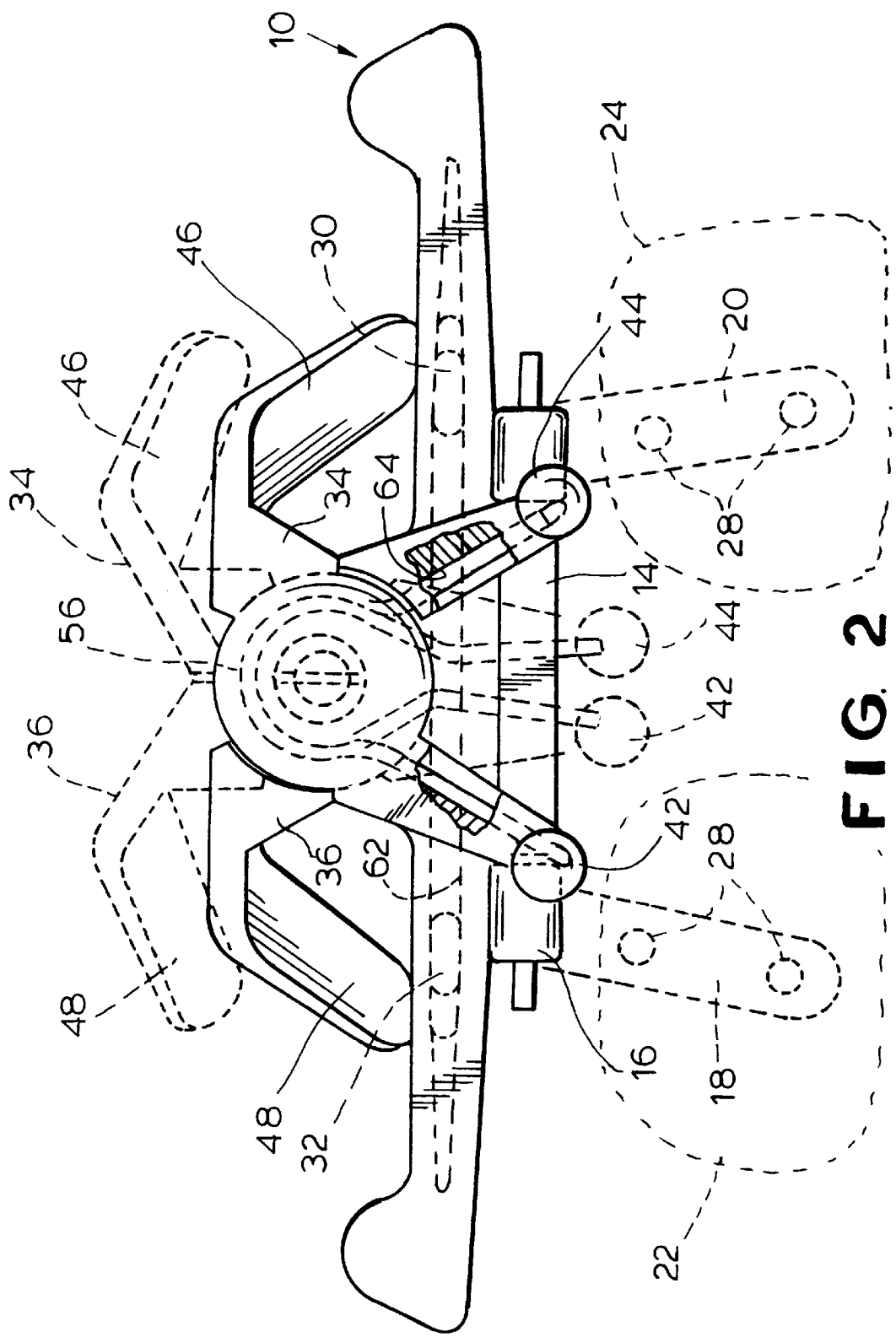
FIG. 2 is a top elevational view of the clip showing the parts in the clamping position in solid and the remote position in phantom, and the lens mounting means in the inoperative position, in phantom.

As seen in the drawings, the clip 10 of the present invention comprises a cross-bar member 12 with a generally triangular base 14 fixed thereto. Base 14 has a substantially planar top surface with an elongated recess 15, which extends across the top surface, from one edge to the other, in a direction generally parallel to member 12.

A bistable lens mounting bracket 16 is pivotally mounted on base 14. Bracket 16 includes elements 18, 20 for mounting sunglass lenses 22, 24, respectively. Elements 18, 20 are mounted on either end of an elongated element 26, which is rotatably received within recess 15 on base 14. Openings 28 are provided in each bracket element 18, 20 to permit the lenses to be affixed thereto by screws, as is conventional.

Figure 4:
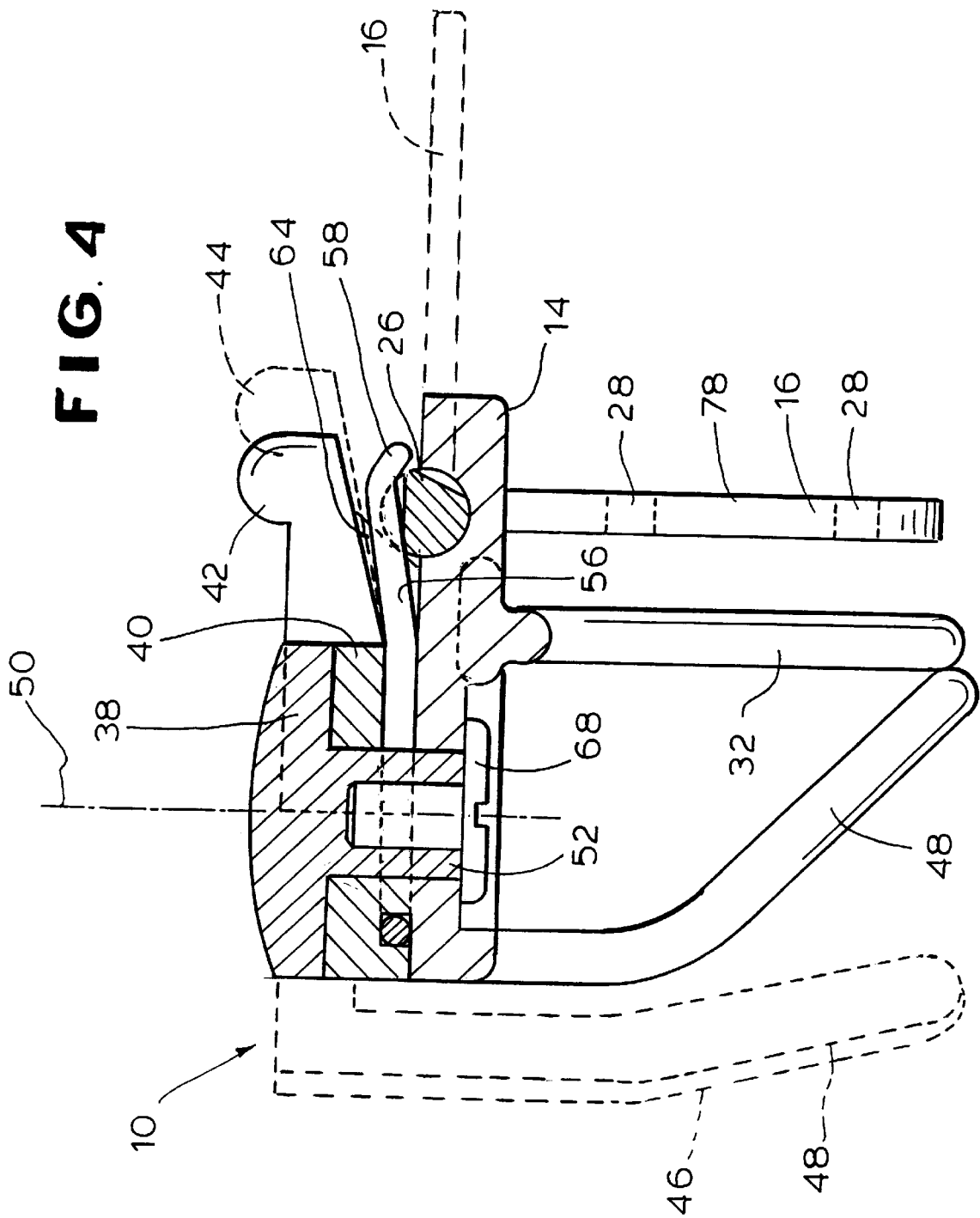
FIG. 4 is a cross-sectional view of the clip taken along line 4—4 of FIG. 3.

Bracket 16, and hence lenses 22, 24, can be pivoted approximately 90 degrees relative to base 14 between an "operative" position, wherein lenses 22, 24 are perpendicular to the plane of base 14 (solid in FIG. 4) and hence proximate the eyeglass lenses and intersecting the line of sight and an "inoperative" position parallel to the plane of base 14 (phantom in FIG. 4) and remote from the eyeglasses and out of the line of sight. Hence, the lenses can be "flipped up" or "flipped down" as needed.

Extending downwardly from cross-bar 12 are a pair of fixed, spaced base clamping arms 30, 32. Rotatably mounted over base 14 are first and second parts 34, 36. Each part 34, 36 has a disk-like central portion 38, 40, respectively, a generally radially extending handle member 42, 44, respectively, and a downwardly and inwardly extending clamping arm 46, 48, respectively. Each of the moveable clamping arms 46, 48 is associated with a different one of the fixed clamping arms 30, 32, respectively. The clamping arms serve to clamp the assembly onto a pair of eyeglasses.

Parts 34, 36 are mounted on base 14 for limited rotation about a common axis 50. Part 34 has a downwardly extending central post 52. Part 36 has an opening 54 in central portion 40 through which post 52 is received. A substantially "U" shaped metal wire spring 56 is situated on base 14. Spring 56 provides the clamping pressure by biasing the moveable clamping arms 46, 48 toward the fixed clamping arms 30, 32 and also biases the bistable lens mounting bracket toward each of its positions.

Spring 56 is received between base 14 and part 36, partially surrounding post 52. The arms 58, 60 of spring 56 bear down on element 26 to hold it within base recess 15 and cooperate with one or the other of the flat surfaces of element 26 (best seen in FIG. 4) to urge the lens mounting bracket toward each of its positions.

Figure 3:
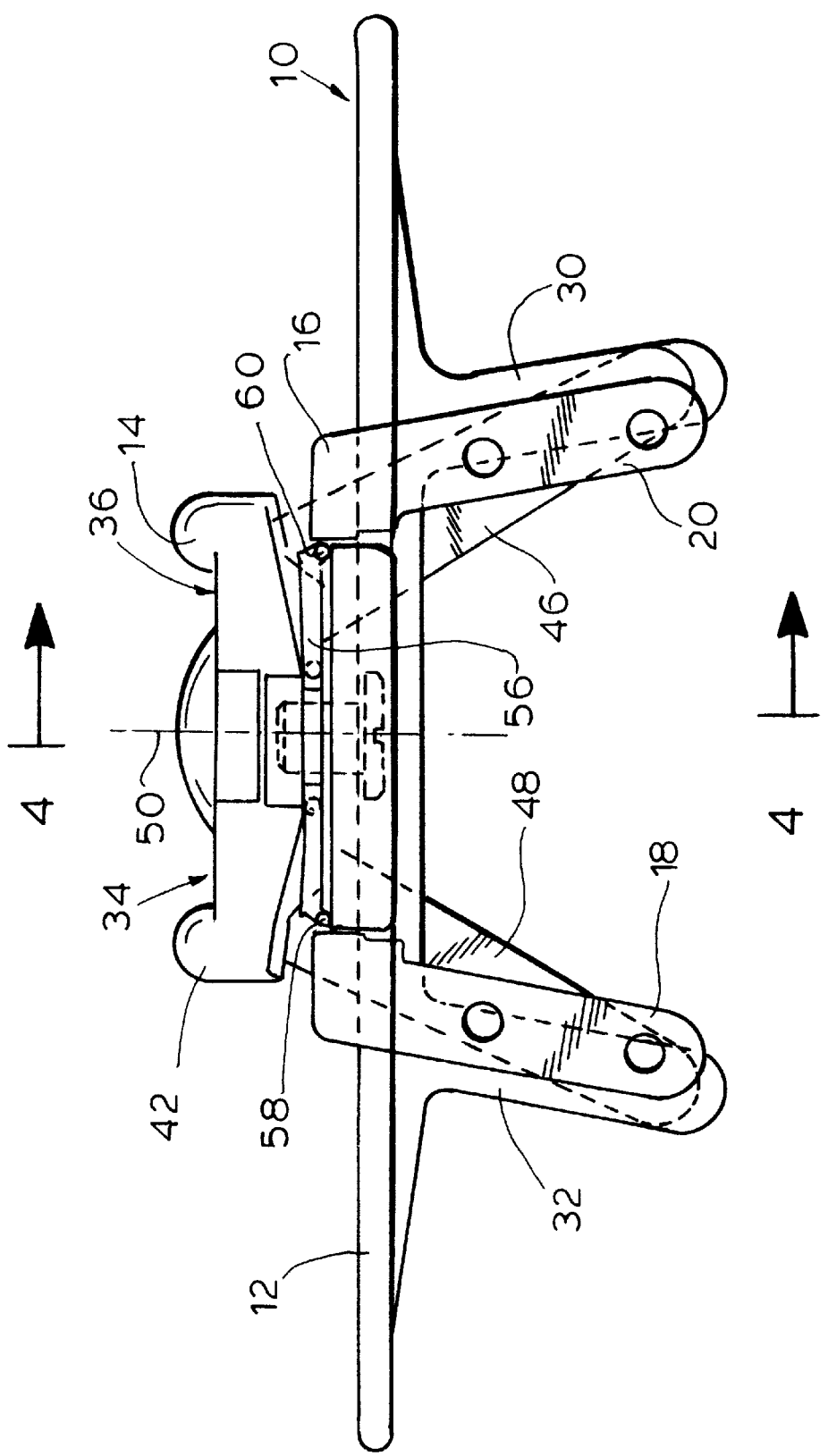
FIG. 3 is a front elevational view of the clip.

As best seen in FIGS. 2 and 3, the underside of each of the handle members 42, 44 includes a recess defined in part by radially extending wall 60, 62, respectively. Each wall 60, 62 has a surface 64, 66 which is in a plane generally perpendicular to the plane of rotation of the part. The arms of spring 56 are situated between and engage surfaces 64 and 66 so as to urge the parts towards a rotational position wherein handle members 42, 44 are remote from each other, and the clamping arms are proximate to each other, as seen in solid in FIG. 2.

Central portion 40 of part 36 is recessed relative to handle member 44 and clamping arm 48 so as to receive central portion 38 of part 34 therein. Handle member 44 and clamping arm 48 of part 36 act as limiting surfaces for the rotation of part 34. Central portions 38 and 40 rotate in substantially parallel planes, about common axis 50.

A fastener 68, in the form of a conventional screw or press-fit plastic pin with an enlarged head, is provided to retain parts 34, 36 and spring 56 on base 14. Base 14 has an opening 70 through which post 52 of part 34 extends. The head of fastener 68 is larger than opening 70. The shaft of fastener 68 is received in an opening in post 52 which is internally threaded or not, depending upon whether the fastener is a screw or pin. The shaft of fastener 68 is situated on axis 50.

Spring 56 normally maintains parts 34, 36 in a position (solid as shown in FIG. 2) where handle members 42, 44 are remote from each other and moveable clamping arms 46, 48 are proximate fixed clamping arms 30, 32 so as to hold the frame on the eyeglasses. When handle members 42, 44 are moved toward each other, rotating parts 34, 36 about axis 50, against the action of spring 56, moveable clamping arms 46, 48 move to a position remote from fixed clamping arms 30, 32 so as to release the force on the eyeglasses and allow removal of the clip-on sunglasses assembly of the present invention therefrom. This is shown in phantom in FIG. 2.

It will now be appreciated that the spring clip of the present invention consists of a small number of simple inexpensive parts which can be easily assembled and held together by a single conventional fastener, in the form of a screw or pin.

While only a single preferred embodiment of the present invention has been disclosed herein for purposes of illustration, it is obvious that many variations and modifications could be made thereto. It is intended to cover all of these variations and modifications which fall within the scope of the invention, as recited in the following claims:

I claim:

1. A spring clip for mounting sunglass lenses comprising a base, a lens, a frame carrying said lens, means for mounting said frame to said base, first and second fixed clamping arms, first and second parts each comprising a moveable clamping arm, each of said moveable clamping arms being associated with one of said fixed clamping arms, said parts being mounted on said base for independent rotational movement about a common axis, between a position wherein said moveable clamping arms are proximate said fixed clamping arms and a position wherein said moveable clamping arms are remote from the said fixed clamping arms, and spring means being operably connected between said parts for urging said parts toward said proximate position.

2. The clip of claim 1 wherein each of said parts comprises a substantially radially extending handle member and wherein moving said handle members towards each other causes said parts to rotate toward said remote position, against the urging of said spring means.

3. The clip of claim 2 wherein said spring has first and second arms and wherein each of said arms is associated with a different one of said handle members.

4. The clip of claim 1 wherein each of said parts has a substantially disk-shaped central portion.

5. The clip of claim 1 wherein each of said parts has a central portion and wherein said central portions rotate in substantially parallel planes.

6. The clip of claim 1 wherein one of said parts has a central opening and the other of said parts has a post adapted to be received within said opening.

7. The clip of claim 6 wherein said frame comprises a base has an opening adapted to receive said post.

8. The clip of claim 6 wherein said post has an axis and said post axis is said common axis.

9. The clip of claim 1 wherein said spring is substantially "U" shaped.

10. The clip of claim 1 further comprising bistable lens mounting means movably mounted to said base.

11. The clip of claim 10 wherein said lens mounting means is moveable relative to said base between operative and inoperative positions and wherein said spring means biases said lens mounting means toward each of said positions.

12. The clip of claim 10 wherein said lens mounting means is pivotally mounted on said base.

13. The clip of claim 1 wherein said common axis is substantially perpendicular to said base.

14. A spring clip for mounting sunglass lenses comprising a base, a lens, a frame for carrying said lens, bistable means for mounting said frame to said base for movement between operative and inoperative positions, said mounting means comprising an elongated element having first and second substantially flat surfaces and spring means mounted on said base, said spring means having an end cooperating with said elongated element surfaces to bias said lens mounting means toward said operative and inoperative positions.

15. The clip of claim 14 wherein said spring means comprises a substantially "U" shaped body with first and second arms.

16. The clip of claim 14 further comprising a first part situated on said base, said first part having a post and wherein said spring means is received around at least a portion of said post.

17. The clip of claim 16 further comprising a second part situated on said base, between said base and said first part.

18. The clip of claim 17 wherein each of said parts comprises a handle member and wherein said spring means is operably interposed between said handle members.

19. The clip of claim 18 wherein each of said parts comprises a clamping arm.

20. The clip of claim 19 wherein said base further comprises first and second fixed arms, each of said fixed arms being associated with the clamping arm of a different one of said parts.

21. The clip of claim 20 wherein each of said parts is mounted for movement relative to said base between a position wherein said part clamping arms are proximate the fixed clamping arms and a position wherein said part clamping arms are remote from said fixed clamping arms and wherein said spring means urges said parts towards said proximate position.

22. A spring clip for mounting sunglass lenses comprising a base, a lens, a frame carrying said lens, means for mounting said frame to said base, first and second fixed clamping arms, first and second parts each comprising a moveable clamping arms, each of said moveable clamping arms being associated with one of said fixed clamping arms, said parts being mounted on said base for relative rotational movement about a common axis, between a position wherein said moveable clamping arms are proximate said fixed clamping arms and a position wherein said moveable clamping arms are remote from the said fixed clamping arms, and spring means being operably connected between said parts for urging said parts toward said proximate position, wherein each of said parts comprises a substantially radially extending handle member and wherein moving said handle members towards each other causes said parts to rotate toward said remote position, against the urging of said spring means.

23. The clip of claim 22 wherein each of said parts has a substantially disk-shaped central portion.

24. The clip of claim 23 wherein said spring has first and second arms and wherein each of said arms is associated with a different one of said handle members.

25. The clip of claim 22 wherein each of said parts has a central portion and wherein said central portions rotate in substantially parallel planes.

* * * * *